(12) United States Patent
Hartzheim

(10) Patent No.: US 6,834,226 B2
(45) Date of Patent: Dec. 21, 2004

(54) MULTIPLE CONTROL LOOP ACCELERATION OF TURBOALTERNATOR AFTER REACHING SELF-SUSTAINING SPEED PREVIOUS TO REACHING SYNCHRONOUS SPEED

(75) Inventor: Anthony A. Hartzheim, Palm Beach, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

(21) Appl. No.: 10/662,141

(22) Filed: Sep. 12, 2003

(65) Prior Publication Data

US 2004/0122581 A1 Jun. 24, 2004

Related U.S. Application Data

(60) Provisional application No. 60/410,403, filed on Sep. 13, 2002.

(51) Int. Cl.$^7$ .............................. G06F 19/00; G06G 7/70
(52) U.S. Cl. ....................... 701/100; 701/101; 701/110; 701/112; 701/121; 477/30; 60/790; 700/290
(58) Field of Search ................................ 701/100–103, 701/110, 112, 121; 477/30; 318/139, 779; 60/778, 786, 790, 39.182, 39.281; 700/290

(56) References Cited

U.S. PATENT DOCUMENTS

| | | | |
|---|---|---|---|
| 4,010,605 A | * | 3/1977 | Uram ........................... 60/790 |
| 5,430,362 A | * | 7/1995 | Carr et al. .................. 318/779 |
| 6,314,717 B1 | | 11/2001 | Teets et al. |
| 2003/0110777 A1 | * | 6/2003 | O'Connor ..................... 60/778 |

* cited by examiner

*Primary Examiner*—Gertrude A. Jeanglaude
(74) *Attorney, Agent, or Firm*—Webb Ziesenheim Logsdon Orkin & Hanson, P.C.

(57) ABSTRACT

A method of operating a turboalternator when the turbine engine speed is between synchronous speed and self-sustaining speed.

9 Claims, 10 Drawing Sheets

PRIOR ART

MULTIPLE CONTROL LOOP ACCELERATION OF TURBOALTERNATOR AFTER REACHING SELF-SUSTAINING SPEED PREVIOUS TO REACHING SYNCHRONOUS SPEED

CROSS REFERENCE TO RELATED APPLICATION

This application claims the benefit of U.S. Provisional Application Ser. No. 60/410,403, filed Sep. 13, 2002, which is hereby incorporated by reference in its entirety.

BACKGROUND OF THE INVENTION

1. Field of the Invention

This invention relates generally to the field of gas turbine engines for the generation of electricity and, more particularly, to a method for controlling exhaust gas temperature of a gas turbine engine after reaching self-sustaining speed but prior to reaching synchronous speed.

2. Description of the Prior Art

Gas turbine engines are utilized to drive a rotor or drive shaft in a turboalternator. The rotation of the rotor or drive shaft coupled with electronic devices creates electric power as is known in the art. The starting of a gas turbine engine is a complex operation. Typically, before the gas turbine engine is run on its own power, the engine must be accelerated by an external electric source, such as a battery, to provide sufficient airflow to the combustor for ignition. In a turboalternator having a permanent magnet rotor/generator coupled to a gas turbine engine, supplying electrical power to the permanent magnet rotor/generator will have it function as a motor to drive the gas turbine engine. Typically, engine speed varies as a function of the torque versus speed characteristics of the starter motor.

Prior to ignition, a fuel/air mixture is created in the combustion chamber. Once the correct fuel-to-air ratio is achieved, the fuel/air mixture in the combustion chamber is ignited. At this point, the gas turbine engine is driven by a combination of the power exerted from the external electric source and the power created by combustion within the combustion chamber of the gas turbine engine. The power supplied by the combination of the external electric source and the combustor within the combustion chamber continues to accelerate the gas turbine engine until it reaches self-sustaining speed. After self-sustaining speed has been reached, the external electric source is usually disabled, and the additional acceleration required for the gas turbine engine to reach synchronous speed is supplied internally by combustion.

Once the external electric source has been disabled, it is advantageous to control the acceleration of the gas turbine engine until synchronous speed is reached. While the gas turbine engine continues to accelerate, it is also advantageous to make sure that the exhaust gas temperature (EGT) does not reach a temperature level that could damage the turboalternator.

A prior art method of controlling the gas turbine engine after the external electric source has been disabled uses an open-loop control system. Before starting the gas turbine engine, two EGT levels are defined: (1) a maximum start EGT; and (2) a maximum operational EGT. The "maximum start EGT" refers to a level of EGT to limit below during the start up sequence of the gas turbine engine. The "maximum operational EGT" refers to the maximum EGT to limit below after achieving synchronous speed. By "maximum EGT" is meant the maximum level of EGT that can be allowed for operation before shutting down the gas turbine engine. If the actual EGT is above the maximum start EGT when entering the stage of operation between self-sustaining speed and synchronous speed, the gas turbine engine will shut down. If the actual EGT is not above the defined maximum start EGT when entering the stage of operation between self-sustaining speed and synchronous speed, the fuel valve is opened until the actual EGT reaches the maximum operational EGT. Once the maximum operational EGT is reached, the fuel valve is controlled around the maximum operational EGT using an open-loop controller.

The above prior art method for controlling the gas turbine engine after the electric source has been disabled commonly results in either: (1) improper control of acceleration; or (2) overheating in the combustion chamber causing the gas turbine engine to shut down and, possibly, causing damage to the gas turbine engine. These results occur because of the inherent instability involved in open-loop control.

It is, therefore, an aspect of the present invention to avoid overheating of the gas turbine engine by providing a method for controlling fuel flow to the combustor, thereby limiting the EGT.

SUMMARY OF THE INVENTION

The method for controlling the acceleration rate and EGT of a gas turbine engine of the present invention utilizes a turbine compressor, an annular combustor, and a control system containing two PID controllers. The annular combustor can include a single fuel source or multiple fuel sources.

Prior to operating a gas turbine engine, the following steps should be taken: (1) defining a moderate EGT; and (2) creating a table of acceleration rates. The table should be a three-dimensional table which utilizes turbine engine speed, inlet temperature, and EGT as its parameters. By "moderate EGT" is meant a certain level of EGT that is as low as operationally possible that will limit exposure of the turbine engine to high temperature.

In order to maintain the operation of the turbine gas engine, compressed air and fuel are continually fed to the combustion chamber. Next, the external electric source is disabled upon a sensing device sensing that the gas turbine engine has reached self-sustaining speed. After the external electric source is disabled, the method of operating a gas turbine engine involves the following steps: (1) enabling a timing device; (2) monitoring the EGT, speed of the engine rotor or turbine drive shaft, the acceleration rate of the engine rotor or turbine drive shaft, and the inlet temperature; (3) requesting an acceleration rate from the created table; (4) enabling a PID controller to request a fuel valve position based upon the requested acceleration rate and the actual acceleration rate of the gas turbine engine; (5) enabling a PID controller of a control system to request a fuel valve position based upon the defined moderate EGT and the actual EGT gas turbine engine; (6) selecting the requested fuel valve position based upon the request that results in the least amount of fuel entering into the combustion chamber; (7) exiting the control loop if synchronous speed is reached; (8) exiting the control loop if the engine does not reach synchronous speed within a predetermined time in order to shut down and purge the combustion chamber; and (9) repeating steps 1 through 8 until synchronous speed is reached.

BRIEF DESCRIPTIONS OF THE DRAWINGS

Additional advantages and features of the invention are explained in greater detail below with reference to the exemplary embodiments illustrated in the accompanying schematic drawings in which like reference symbols identify like parts throughout:

BRIEF DESCRIPTION OF THE PREFERRED EMBODIMENT

In a gas turbine engine, inlet air from the gas turbine compressor is continuously compressed, mixed with fuel in an inflammable proportion, and then contacted with an ignition source to ignite the mixture when the proportion of fuel and compressed air reaches a flammable proportion, which will then continue to burn. Heat energy is released causing combustion gases to flow across a turbine where it is converted to rotary energy for driving equipment, such as an electrical generator. The combustion gases are then exhausted to the atmosphere. The rate of fuel flow and percentage of fuel and compressed air forced in the combustor determines the operation of a gas turbine engine between self-sustaining speed and synchronous speed which occurs in a combustor.

Figure 1:
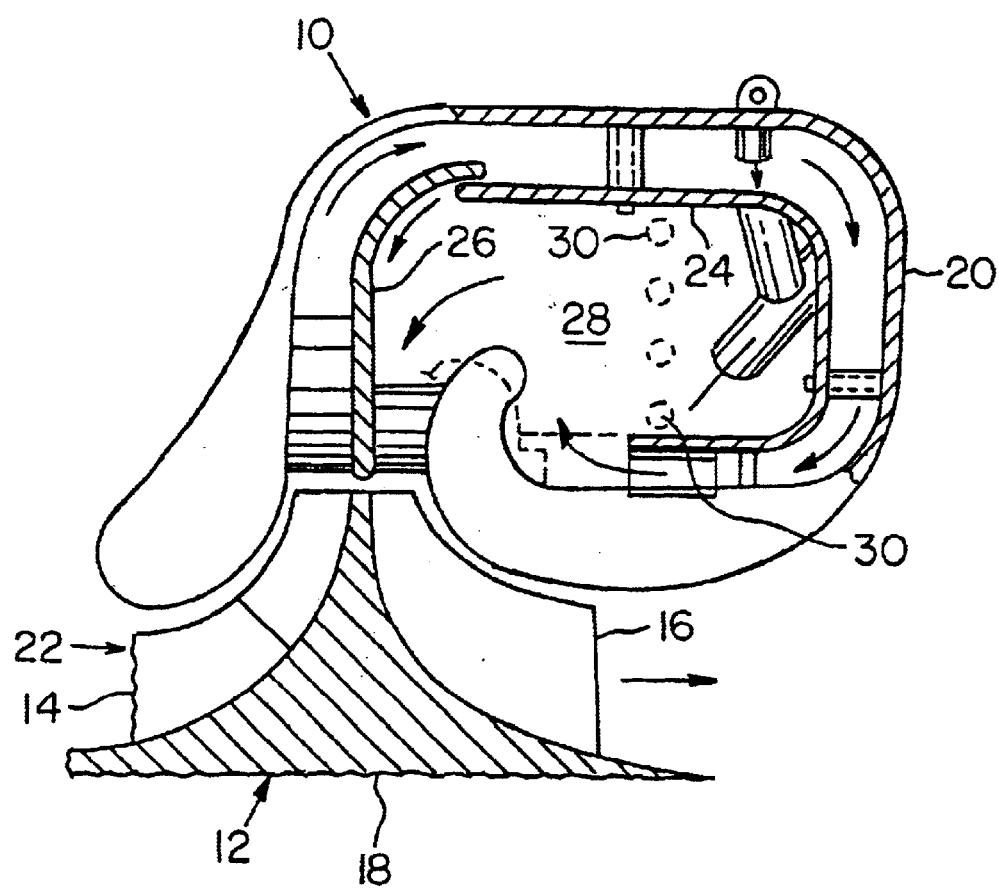
FIG. 1 is a partial section of a portion of an annular combustor.

FIG. 1 shows a partial cross section of a portion of an annular combustor 10 connected to a turbine engine compressor 12. Engine compressor 12 includes compressor blades 14 and turbine blades 16 positioned around an engine rotor or turbine drive shaft 18.

An annular outer housing wall 20 is provided and defines an air intake passage 22 positioned adjacent to compressor blades 14. An outer combustor liner wall 24 and an inner housing wall 26 define an annular combustion chamber 28. The combustion chamber 28 can be supplied with a multiple number of fuel orifices 30. A method of the present invention for controlling acceleration and EGT after the gas turbine engine reaches self-sustaining speed but prior to the engine reaching synchronous speed occurs in the combustion chamber 28. By "self-sustaining speed" is meant the operating speed of the gas turbine engine using combustion energy. By "synchronous speed" is meant the nominal operating speed of the gas turbine engine with or without a load.

A detailed description of the annular combustor 10 is described in PCT Patent No. WO 98/25082, which is hereby incorporated by reference.

Figure 2:
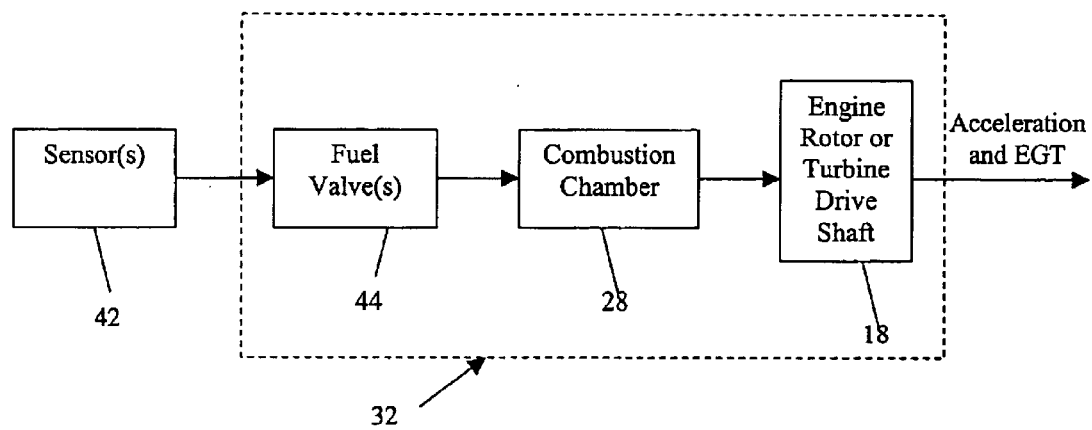
FIG. 2 is a flow diagram generally displaying a prior art method of operating a gas turbine engine when the engine is operating between self-sustaining speed and synchronous speed.

FIG. 2 displays a general flowchart of a prior art method using an open-loop control system to control the operation of a gas turbine engine after reaching self-sustaining speed but prior to reaching synchronous speed. The prior art control method uses open-loop control logic to control the EGT. The fuel valve 44 is opened until the EGT reaches a pre-defined temperature. When the EGT reaches the pre-defined temperature, the fuel valve is opened or closed based upon information received from sensors 42, such as a thermocouple. The acceleration of the gas turbine engine 32 is never taken into account, as the output acceleration is never fed back into the control loop. Because of the inherent delay and instability in open-loop control systems, the result of operating a gas turbine engine 32 using the prior art method often results in improper acceleration of the gas turbine engine 32 or overheating in the combustion chamber 28.

Figure 3:
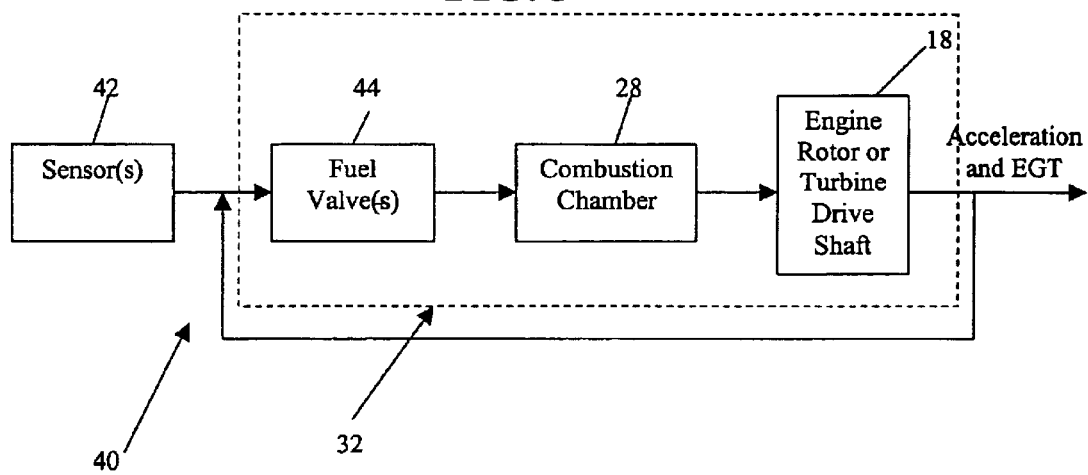
FIG. 3 is a flow diagram generally displaying a method of operating a gas turbine engine when the engine is operating between self-sustaining speed and synchronous speed according to the present invention.
Figure 4:
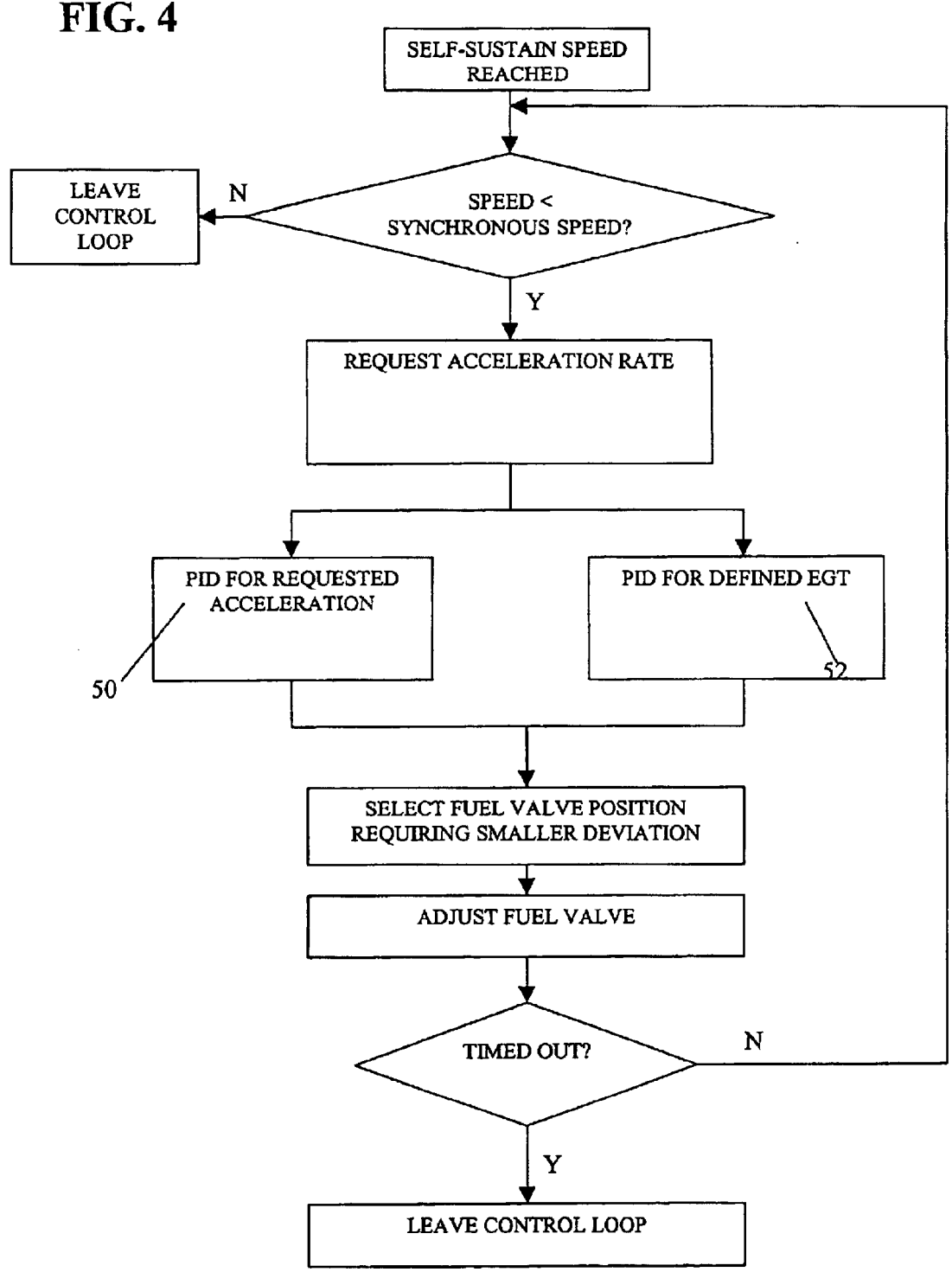
FIG. 4 is a general flow diagram of the control logic according to the present invention.

FIGS. 3 and 4 represent flowcharts generally displaying the method of the present invention. FIG. 3 represents a flowchart of the hardware interactions and FIG. 4 represents a flowchart of the control logic. Referring to FIG. 3, the control system 40 has control loops that use acceleration feedback information along with sensors 42 that sense EGT to avoid harmful fluctuations in either acceleration or EGT. The feedback information along with information from the sensors 42 determines the amount of fuel to be passed through the fuel valve 44 and into the combustion chamber 28. The energy created in the combustion chamber 28 then accelerates the gas turbine engine 32. Control loops within the control system 40 refer to the parameters being controlled using feedback information.

Figure 5:
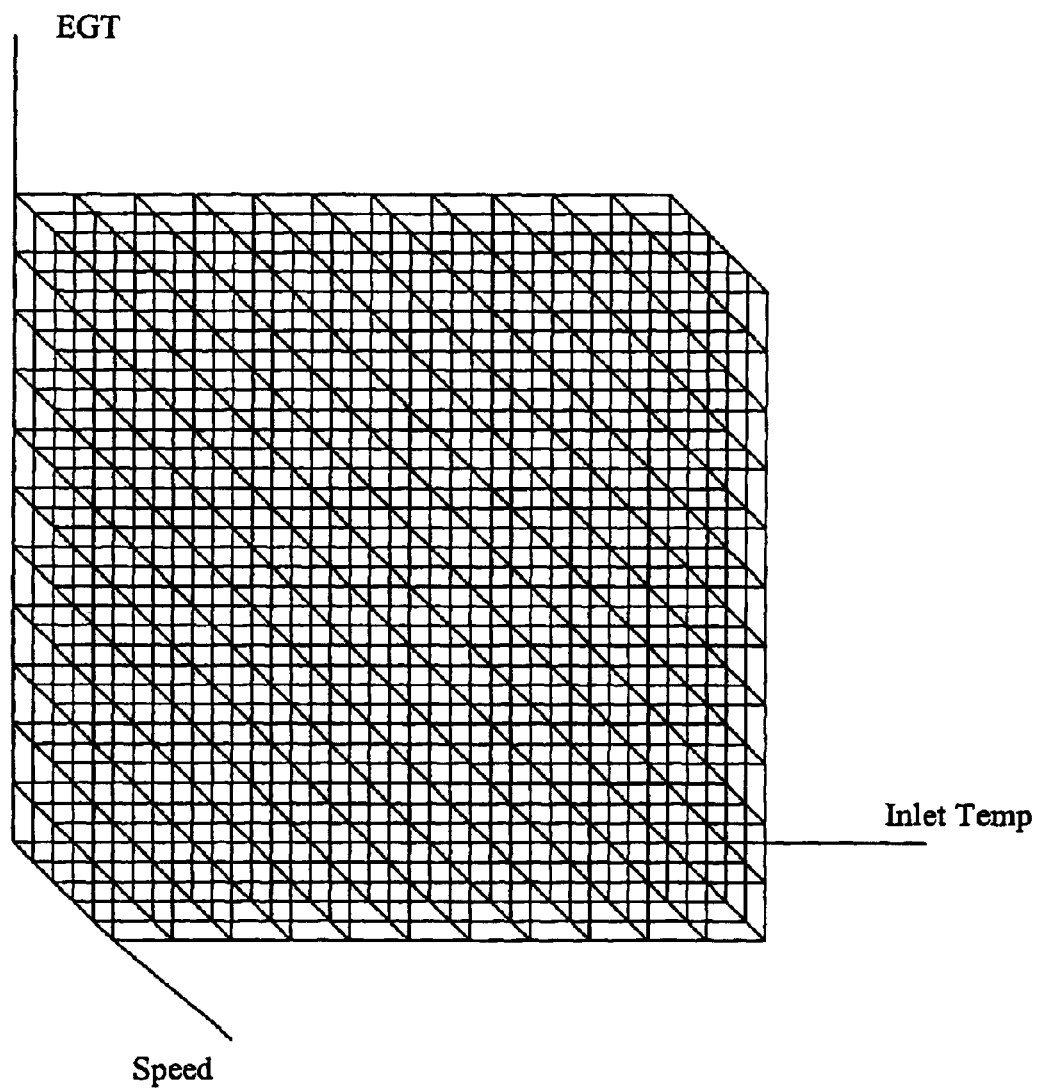
FIG. 5 is a depiction of a data table with three axes.

Referring to FIGS. 3 and 4, the control system 40 is entered when the gas turbine engine 32 reaches self-sustaining speed and an external electric source has been disabled. Within the control system 40, a sensor 42, such as a tachometer, will determine if synchronous rotor speed (revolutions per minute) has been reached. If the gas turbine engine 32 has reached synchronous rotor speed, the control system 40 will be exited. If the gas turbine engine 32 has not reached synchronous rotor speed, an acceleration rate is requested. The requested acceleration rate can be determined from a pre-defined table of acceleration rates. The acceleration of turbine engine 32 is a function of: (1) rotor speed; (2) the temperature of the air entering the engine compressor 12, i.e., inlet temperature; and (3) the EGT. FIG. 5 displays an example of a table with three axes with values based on a function with the above three variables. A table can be created to store acceleration rates. For example, if inlet temperature is between −20° F. and 140° F., EGT would be between 300° F. and 1200° F., and speed would be between 10,000 rpm and 70,000 rpm (not shown). By defining the axis using the above-identified three variables, the control system can quickly request an acceleration rate from the table.

At this point, the control system 40 will enable two PID controllers: one for acceleration 50 and one for moderate EGT 52. The acceleration PID controller 50 utilizes the requested acceleration rate and the current acceleration rate to determine the position of the fuel valve 44 in order to meet the requested acceleration. The EGT PID controller 52 utilizes a pre-defined moderate EGT and the current EGT to determine the position of the fuel valve 44 in order to meet the pre-defined EGT. The control system 40 then selects the fuel valve position that allows the lesser amount of fuel into the combustion chamber 28. Using this method of control, the EGT should not reach temperatures that would damage the gas turbine engine 32 and the acceleration of the gas turbine engine 32 should not fluctuate in a manner that could damage the gas turbine engine 32.

After the fuel valve 44 has been positioned in the proper location, the control system 40 enables a timing device 54 to see if the control loop has timed out. The time entered into the timing device 54 is predetermined through experimentation and testing, and is based on startup rates of the particular gas turbine engine. The time is entered as a safety precaution. If the machine takes too long to reach synchronous speed, the control loop is exited and the gas turbine engine is shut down and purged. If the control loop has not timed out, the process is started again.

Figure 6:
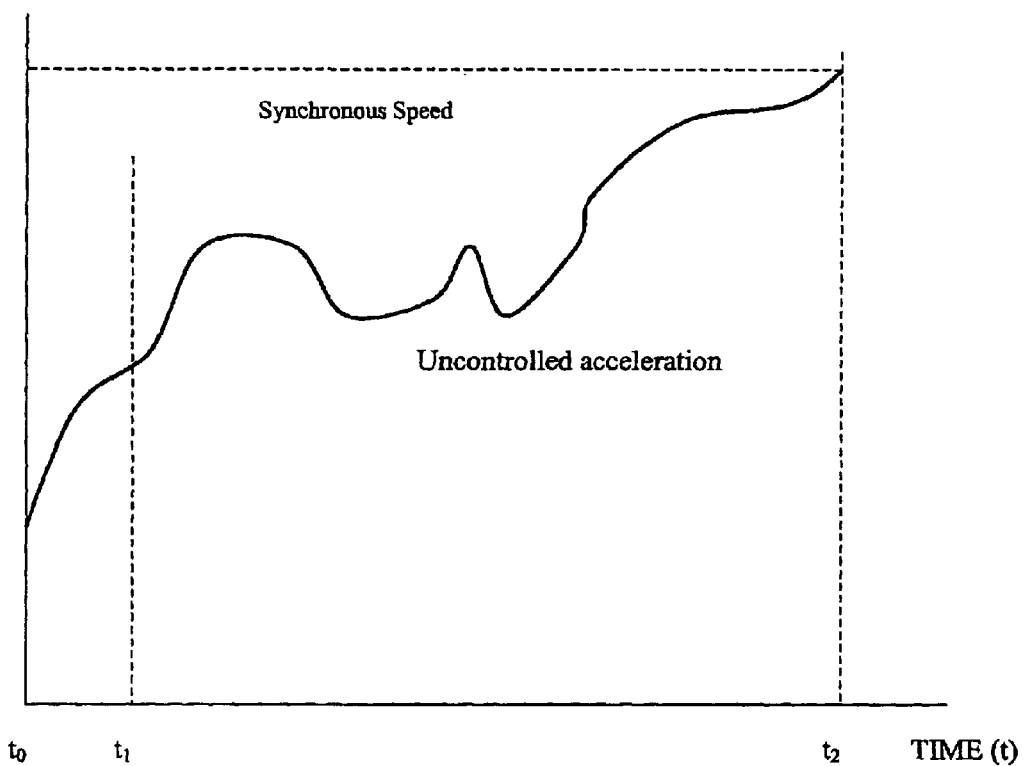
FIG. 6 is a graph of gas turbine engine speed versus time for a gas turbine engine utilizing a prior art method.

FIG. 6 graphically shows gas turbine engine speed versus time during the operation of a gas turbine engine between self-sustaining speed and synchronous speed utilizing a prior art method. At time $t_0$, the gas turbine engine speed has reached self-sustaining speed. At time $t_1$, the EGT from the combustion chamber 28 has met the pre-defined maximum operational EGT. At time $t_2$, the gas turbine engine has reached synchronous speed. As can be seen, between time $t_1$ and time $t_2$ there are wild fluctuations in the engine speed. These fluctuations exist for two reasons: (1) the acceleration of the gas turbine engine is never taken into account within the open-loop control system; and (2) open-loop control systems are inherently unstable.

Figure 7:
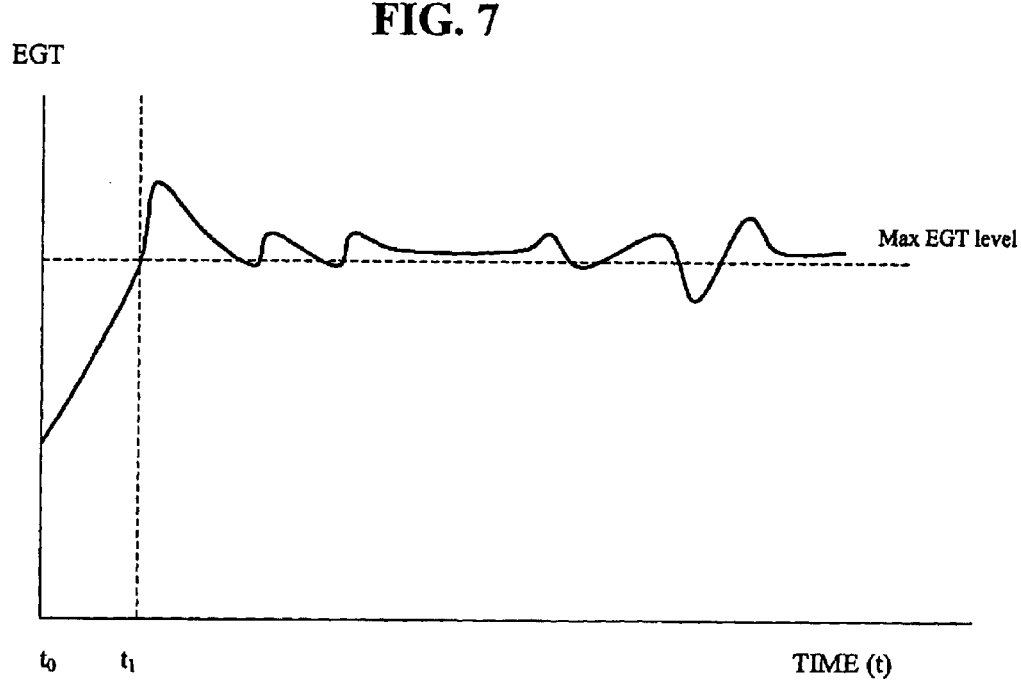
FIG. 7 is a graph of the exhaust gas temperature versus time for a gas turbine engine utilizing a prior art method.

FIG. 7 graphically shows EGT versus time during the operation of a gas turbine engine between self-sustaining speed and synchronous speed utilizing a prior art method. At time to, the gas turbine engine has reached self-sustaining speed. At time $t_1$, the pre-defined maximum operational EGT has been reached. As displayed by FIG. 7, there are still fluctuations in the EGT even after the pre-defined maximum operational EGT has been reached. The fluctuations exist because of the instability in open-loop control.

Figure 8:
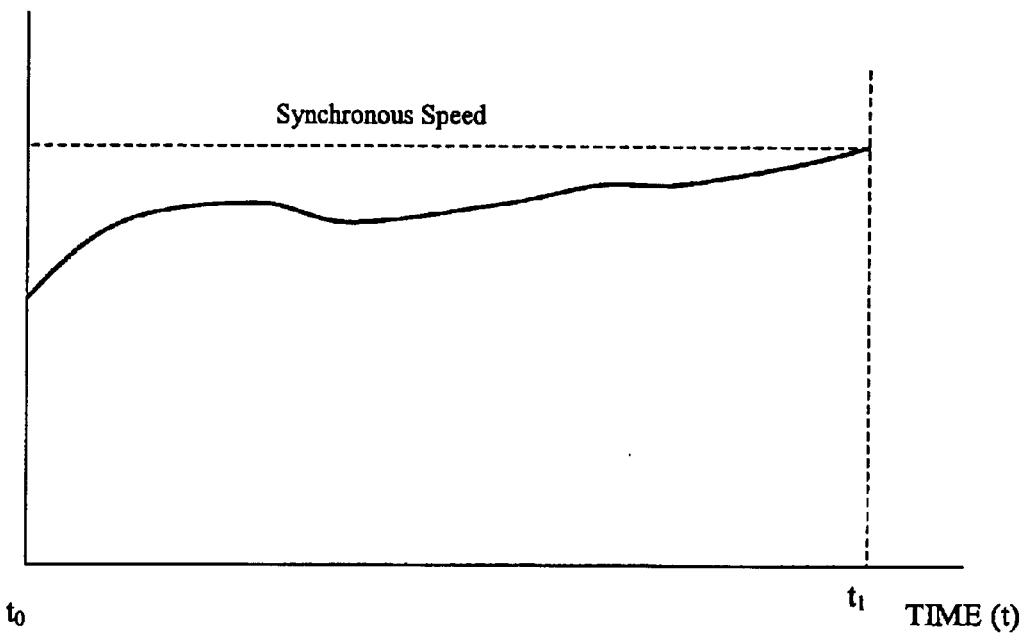
FIG. 8 is a graphical representation of acceleration versus time for a gas turbine engine utilizing the present invention.

FIG. 8 graphically shows what is believed to be gas turbine engine speed versus time during the operation of a gas turbine engine between self-sustaining speed and synchronous speed utilizing the method of the present invention. In the example displayed in FIG. 8, both the pre-defined moderate EGT and self-sustaining speed have been reached at time $t_0$. At time $t_1$, synchronous speed has been reached. As shown in FIG. 8, there does not exist any wild fluctuations in speed that could result in damage to the gas turbine engine 32.

Figure 9:
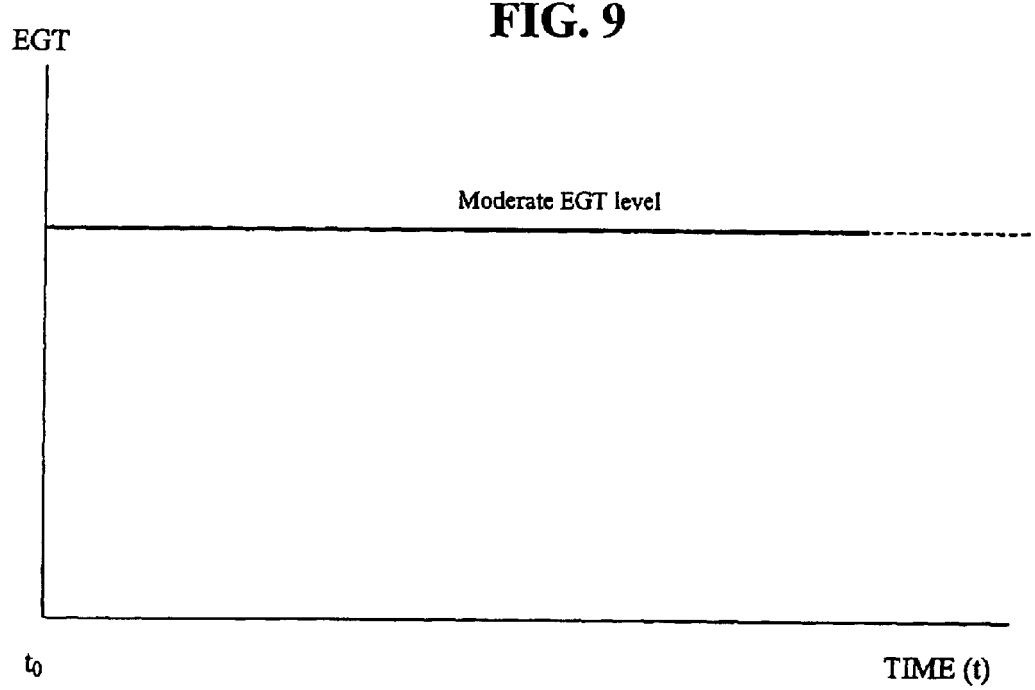
FIG. 9 is a graphical representation of exhaust gas temperature versus time for a gas turbine engine utilizing the present invention.
Figure 10:
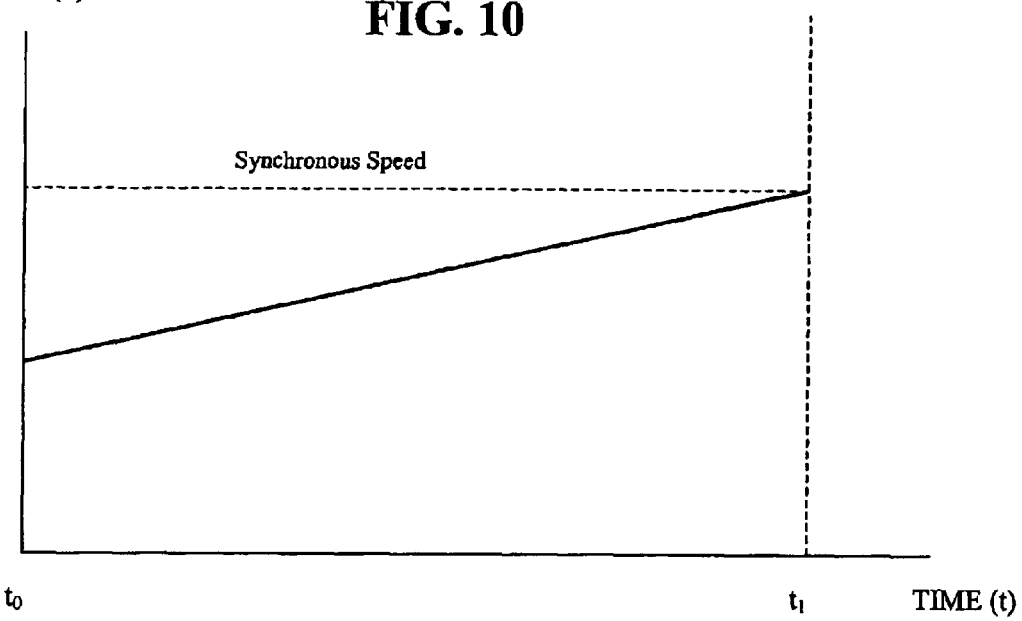
FIG. 10 is a graphical representation of acceleration versus time for a gas turbine engine utilizing the present invention.

FIG. 9 graphically shows what is believed to be EGT versus time during the operation of a gas turbine engine between self-sustaining speed and synchronous speed utilizing the method of the present invention. At time $t_0$, self-sustaining speed has been reached. The pre-defined moderate EGT has been reached prior to entering into the phase of operation between self-sustaining speed and synchronous speed. Referring to FIGS. 7 and 9, the difference in stability after the pre-defined EGT has been reached is clearly displayed. Closed-loop PID control systems are extremely stable and the overshoot of the EGT can be controlled in a closed-loop PID control system. Referring to FIGS. 8 and 10, it can be seen in this embodiment that the closed-loop control system 40 could always be selecting the requested EGT rate. This is because the PID controller 52 for the maximum EGT rate would request a fuel valve position that allowed a lesser amount of fuel into the combustion chamber 28 when compared to the fuel valve position requested by the PID controller 50 for the acceleration rate.

Figure 11:
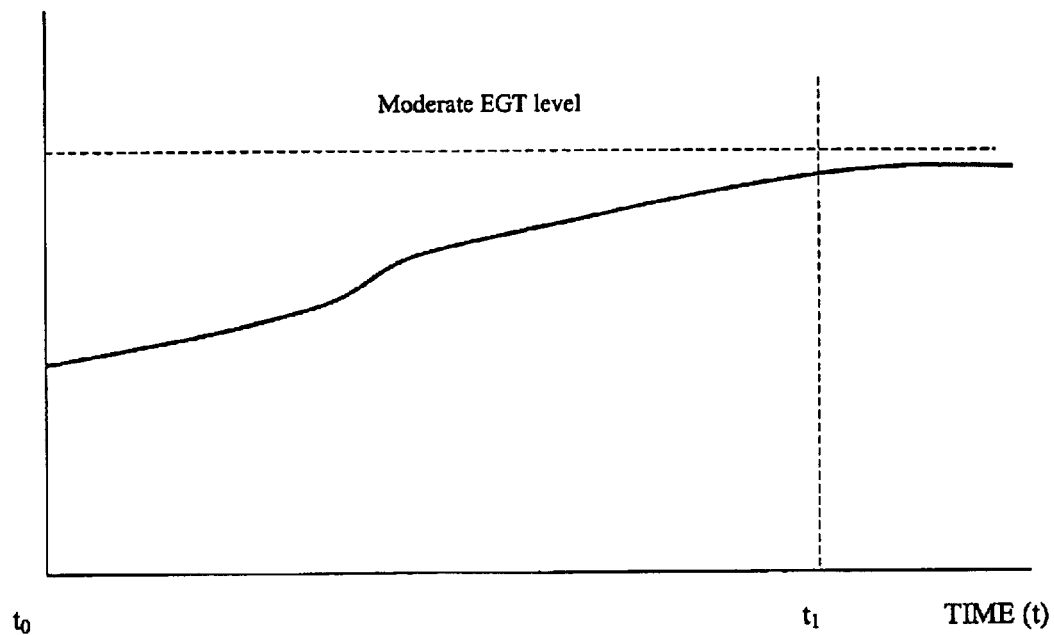
FIG. 11 is a graphical representation of exhaust gas temperature versus time for a gas turbine engine utilizing the present invention.

FIG. 10 graphically shows what is believed to be gas turbine engine speed versus time during the operation of a gas turbine engine between self-sustaining speed and synchronous speed using the present invention. Referring to FIGS. 10 and 11, the pre-defined maximum EGT is never reached. At time $t_0$, self-sustaining speed has been reached and, at time $t_1$, synchronous speed has been reached. As shown in FIGS. 10 and 11, the closed-loop control system 40 would always be selecting the requested acceleration rate. This is because the PID controller 50 for the acceleration rate would request a fuel valve position that allowed a lesser amount of fuel into the combustion chamber 28 when compared to the fuel valve position requested by the PID controller 52 for maximum EGT.

The examples given in FIGS. 8 and 9 and FIGS. 10 and 11 are the extreme examples that occur when either the fuel valve position requested by the PID controller 52 for the maximum EGT or the fuel valve position requested by the acceleration PID controller 50 are constantly requesting a fuel valve position, thereby allowing a lesser amount of fuel into the combustion chamber 28. Typically, one PID controller will not control the fuel valve position for the entire operating process between self-sustaining speed and synchronous speed. Having both the acceleration PID controller 50 and the PID controller 52 for maximum EGT contributing to the position of the fuel valve 44 allows for controlled operation of the gas turbine engine 32 without danger of overheating the combustion chamber 28 or wildly fluctuating the speed of the turbine engine 32.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

I claim:

1. A method for operating a gas turbine engine after the engine reaches self-sustaining speed but prior to the engine reaching synchronous speed, comprising the steps of:
    a) sensing that the turbine engine has reached self-sustaining speed;
    b) disabling an external electric source;
    c) defining a moderate EGT;
    d) creating a table for looking up acceleration rates based upon a function with variables of (1) speed of the engine rotor or turbine drive shaft, (2) temperature of the compressed air supplied to the combustion chamber, and (3) EGT;
    e) enabling a timing device;
    f) monitoring the EGT of the gas turbine engine, the speed and acceleration rate of the gas turbine engine, and the temperature of compressed air supplied to a combustion chamber for combustion of the gas turbine engine;
    g) requesting an acceleration rate from the table by a control system;
    h) enabling a PID controller of the control system to request a fuel valve position based upon the requested acceleration rate and an actual acceleration rate of the gas turbine engine;
    i) enabling a PID controller to request a fuel valve position based upon the defined moderate EGT and an actual EGT of the gas turbine engine;

j) selecting the requested fuel valve position based upon the request that results in the lesser amount of fuel being supplied to the combustion chamber;

k) exiting the control system upon the engine reaching synchronous speed;

l) exiting the control system upon the engine not reaching synchronous speed within a predetermined time in order to shutdown and purge the combustion chamber; and m) repeating steps (f)–(m) until synchronous speed is reached.

2. A method for operating a gas turbine engine after the engine reaches self-sustaining speed but prior to the engine reaching synchronous speed, comprising the steps of:

a) defining a moderate EGT of the gas turbine engine;

b) monitoring the EGT of the gas turbine engine, the speed and acceleration rate of the gas turbine engine, and the temperature of compressed air supplied to a combustion chamber for combustion of the gas turbine engine;

c) requesting a desired acceleration rate of the gas turbine engine by a control system;

d) enabling a controller of the control system to request a fuel valve position based upon the requested acceleration rate and an actual acceleration rate of the gas turbine engine;

e) enabling the controller to request a fuel valve position based upon the defined moderate EGT and an actual EGT of the gas turbine engine;

f) selecting the requested fuel valve position based upon the request that results in the lesser amount of fuel being supplied to the combustion chamber; and g) exiting the control system upon the engine reaching synchronous speed.

3. The method as claimed in claim 2, further comprising the step of creating a table for looking up acceleration rates based upon a function with variables of (1) speed of a engine rotor or turbine drive shaft of the gas turbine engine, (2) temperature of compressed air supplied to a combustion chamber of the gas turbine engine, and (3) EGT.

4. The method as claimed in claim 2, further comprising the step of sensing that the turbine engine has reached self-sustaining speed.

5. The method as claimed in claim 4, further comprising the step of disabling an external electric source used for accelerating the gas turbine engine.

6. The method as claimed in claim 3, wherein an acceleration rate is requested from the table.

7. The method as claimed in claim 2, further comprising the step of enabling a timing device to determine when to exit the control system.

8. The method as claimed in claim 7, further comprising the step of exiting the control system upon the engine not reaching synchronous speed within a predetermined time in order to shutdown and purge the combustion chamber.

9. The method as claimed in claim 2, further comprising the step of repeating steps (a)–(g) until synchronous speed is reached.

\* \* \* \* \*